(12) United States Patent
Elrom et al.

(10) Patent No.: US 7,930,359 B2
(45) Date of Patent: Apr. 19, 2011

(54) METHODS OF CONSISTENT DATA PROTECTION FOR MULTI-SERVER APPLICATIONS

(75) Inventors: Ofer Elrom, Gilboa (IL); Eran Raichstein, Yokneam Ilit (IL); Gregory John Tevis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 12/365,018

(22) Filed: Feb. 3, 2009

(65) Prior Publication Data
US 2010/0198949 A1 Aug. 5, 2010

(51) Int. Cl.
*G06F 13/00* (2006.01)

(52) U.S. Cl. .................. 709/214; 709/225; 709/229

(58) Field of Classification Search .................. 709/213, 709/214, 215, 216, 223, 224
See application file for complete search history.

(56) References Cited

U.S. PATENT DOCUMENTS

| 7,366,858 B2 * | 4/2008 | Berkowitz et al. ............ 711/162 |
| 2009/0055447 A1 * | 2/2009 | Sudhakar ...................... 707/204 |
| 2010/0011178 A1 * | 1/2010 | Feathergill .................... 711/162 |

* cited by examiner

*Primary Examiner* — Viet Vu
(74) *Attorney, Agent, or Firm* — Zilka-Kotab, PC

(57) ABSTRACT

A method according to one embodiment includes receiving a request to perform a snapshot of data associated with an application running on multiple servers; coordinating I/O Freezers on different servers for freezing data requests from instances of the application running on the servers; and after determining that the I/O Freezers have frozen the data requests, requesting initiation of a snapshot operation to take the snapshot of the data.

8 Claims, 3 Drawing Sheets

USOO7930359B2

METHODS OF CONSISTENT DATA PROTECTION FOR MULTI-SERVER APPLICATIONS

BACKGROUND

The present invention relates generally to an improved data processing system and method, and more specifically to methods for protecting business data using application synchronization across multiple servers.

Protection of business data is a critical part of modern Information Technology (IT) operations. Business data comes in many forms and is managed by a wide variety of business applications including databases, file systems, email applications, online transaction systems, etc. There are a wide variety of data protection systems, methods and techniques for protecting this business data and the business applications that manage that data. These systems, methods, and techniques for data protection include traditional file backups, image backup techniques, storage hardware replication functions, snapshotting, continuous data protection, mirroring, and the like.

Modern business applications and their associated business data are increasingly spread across multiple servers, enabling higher scalability and performance of the applications. In modern application architectures, these applications and data may even be spread across local, regional, national, or in some cases, even global distances. This presents very significant challenges to existing systems, methods and techniques for data protection. One of the most significant challenges this presents is the synchronization of the various components of the application and its associated data in order to obtain a data copy with a consistent view of the application and its data. Without a consistent view of the application and data at some point in time, there is a chance that the application and its data will not be able to be recovered without some level of application or data corruption. This is often due, for example, to inflight transactions that are not complete. This is a problem with any application, even single server applications. Applications that span multiple volumes and multiple servers, especially across distances, present an even more daunting challenge.

One set of prior art in this area is the use of hardware or software snapshotting of volumes, and the grouping of volumes into consistency groups that are replicated together as a group to guarantee their synchronization. One of the key problems with the hardware snapshot solutions approach is that these are implemented at the storage hardware or storage network level and are thus unaware of any required application affinity. The software snapshotting solutions also require additional synchronization with applications as described below.

A solution that brings together the benefits of storage hardware, software, and application based snapshotting technologies would be advantageous. A solution is sought that can take efficient and consistent snapshots of applications and application data, even across multiple storage devices across a single or multiple servers, and perform in a way that minimizes or eliminates application awareness and downtime, and avoids some of the inherent inefficiencies of some application interfaces.

SUMMARY

A method according to one embodiment includes receiving a request to perform a snapshot of data associated with an application running on multiple servers; coordinating I/O Freezers on different servers for freezing data requests from instances of the application running on the servers; and after determining that the I/O Freezers have frozen the data requests, requesting initiation of a snapshot operation to take the snapshot of the data.

A method according to one embodiment includes automatically discovering servers running instances of an application; automatically discovering storage devices associated with each instance of the application; receiving a request to perform a snapshot of data associated with an application running on multiple servers; instructing I/O Freezers on different servers to freeze data requests from instances of the application running on the servers; determining whether the I/O Freezers have frozen the data requests; after determining that all of the I/O Freezers have frozen the data requests, instructing the I/O Freezers to initiate snapshot processing on the data associated with the application so that the I/O Freezers perform the snapshot processing within the same window of synchronization; determining whether the I/O Freezers have initiated the snapshot processing; and after determining that all of the I/O Freezers have initiated the snapshot processing, instructing the I/O Freezers to no longer freeze the data requests.

A method according to one embodiment includes automatically discovering servers running instances of an application; automatically discovering storage devices associated with each instance of the application; automatically discovering operating system and configuration information associated with each instance of the application; receiving a request to perform a snapshot of data associated with an application running on multiple servers; determining an association of I/O Freezers on the servers with the application; instructing the I/O Freezers on different servers to freeze data requests from instances of the application running on the servers; determining whether the I/O Freezers have frozen the data requests; after determining that all of the I/O Freezers have frozen the data requests, instructing the I/O Freezers to initiate snapshot processing on the data associated with the application so that the I/O Freezers perform the snapshot processing within the same window of synchronization; determining whether the I/O Freezers have initiated the snapshot processing; and after determining that all of the I/O Freezers have initiated the snapshot processing, instructing the I/O Freezers to no longer freeze the data requests, wherein data requests made during the freezing are copied and applied after the I/O Freezers are instructed to no longer freeze the data requests.

Any of these embodiments may be implemented in any storage devices, such as solid state drives (SSD), Flash memories, magnetic data storage systems such as a disk drive system, optical devices, network storage devices, virtualized storage devices, etc.

Other aspects and embodiments of the present invention will become apparent from the following detailed description, which, when taken in conjunction with the drawings, illustrate by way of example the principles of the invention.

DETAILED DESCRIPTION

Figure 1:
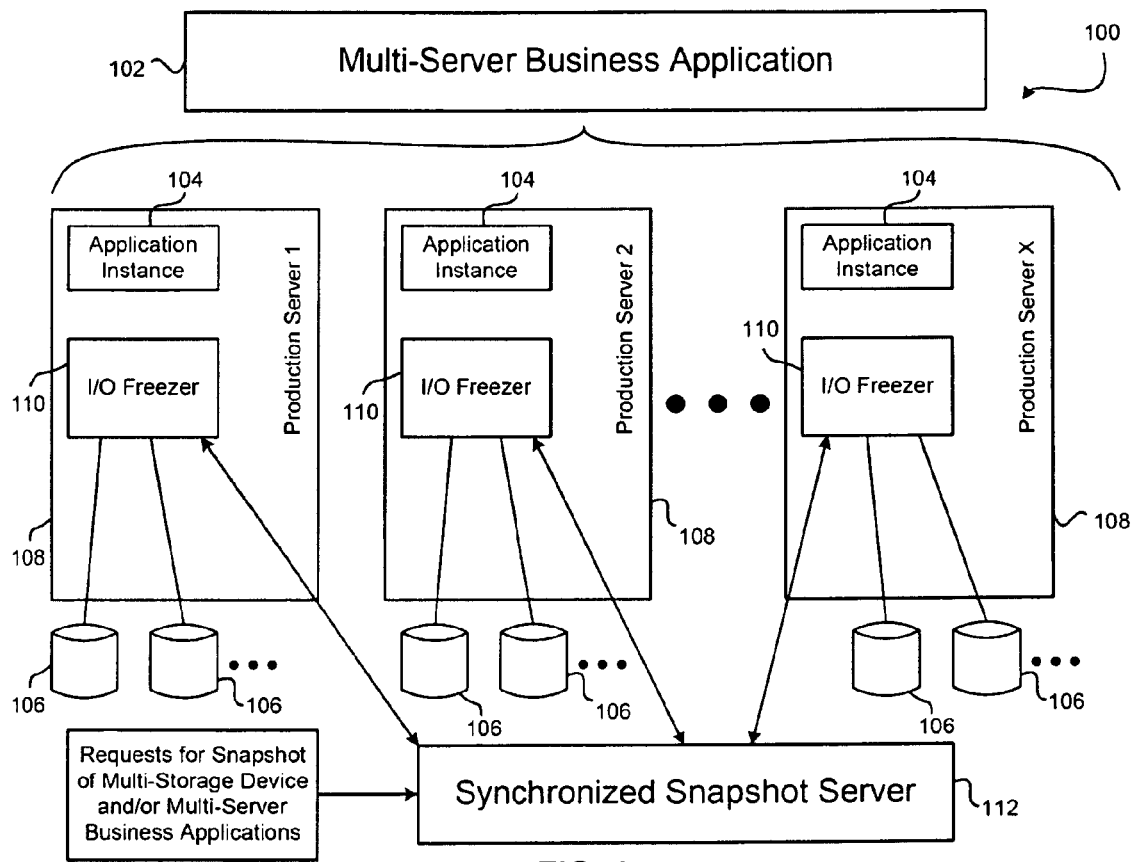
FIG. 1 is a simplified schematic diagram of a system for consistent data protection for multi-server applications according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses systems and methods for protecting business and/or other types of data using application synchronization across multiple servers.

An "I/O Freezer" as used herein may be any Volume driver, Disk driver, I/O filter driver, etc., which can effectively freeze input and output operations, and can initiate a backup operation of data on all volumes, disks, drives, etc., for which the I/O Freezer is associated with.

An "application," as used herein, may be made up of several application instances running on one or more machines, servers, etc., each application instance keeping some kind of data consistency between the data that it manages and the combination of all application instances together make up the application. Also, an application may have many different operations, parts, and/or activities (such as indexing, database and web interface, etc.) and each part, operation, and/or activity may be working from a different machine. All of these application parts, operations, and/or activities together make up the application.

In one general embodiment, a method is provided. In operation, a request to perform a snapshot of data associated with an application running on multiple servers is received. Additionally, I/O Freezers on different servers for freezing data requests from instances of the application running on the servers are coordinated. Furthermore, after determining that the I/O Freezers have frozen the data requests, initiation of a snapshot operation to take the snapshot of the data is requested.

In another general embodiment, a method is provided. In operation, servers running instances of an application are automatically discovered. Additionally, storage devices associated with each instance of the application are automatically discovered. Furthermore, a request to perform a snapshot of data associated with an application running on multiple servers is received. Also, I/O Freezers on different servers are instructed to freeze data requests from instances of the application running on the servers. In addition, it is determined whether the I/O Freezers have frozen the data requests and after determining that all of the I/O Freezers have frozen the data requests, the I/O Freezers are instructed to initiate snapshot processing on the data associated with the application so that the I/O Freezers perform the snapshot processing within the same window of synchronization. Moreover, it is determined whether the I/O Freezers have initiated the snapshot processing and after determining that all of the I/O Freezers have initiated the snapshot processing, the I/O Freezers are instructed to no longer freeze the data requests.

In another general embodiment, a method is provided. In operation, servers running instances of an application are automatically discovered. In addition, storage devices associated with each instance of the application are automatically discovered. Also, operating system and configuration information associated with each instance of the application are automatically discovered. Moreover, a request to perform a snapshot of data associated with an application running on multiple servers is received. In addition, an association of I/O Freezers on the servers is determined with the application. Furthermore, the I/O Freezers on different servers are instructed to freeze data requests from instances of the application running on the servers. Moreover, it is determined whether the I/O Freezers have frozen the data requests, and after determining that all of the I/O Freezers have frozen the data requests, the I/O Freezers are instructed to initiate snapshot processing on the data associated with the application so that the I/O Freezers perform the snapshot processing within the same window of synchronization. In addition, it is determined whether the I/O Freezers have initiated the snapshot processing, and after determining that all of the I/O Freezers have initiated the snapshot processing, the I/O Freezers are instructed to no longer freeze the data requests, wherein data requests made during the freezing are copied and applied after the I/O Freezers are instructed to no longer freeze the data requests.

Application-provided synchronization across multiple servers has been attempted by others, but these approaches are deficient in that they are implemented at the application level, they are application specific and do not apply to other applications, they typically require writing to application APIs, and they usually entail a performance cost. In addition, host based volume replication solutions exist but do not synchronize replications across multiple volumes on multiple systems.

Despite interest in this area, few applications have enabled themselves with synchronization checkpoints and interfaces, even for single server implementations of the application. With multiple server implementations of applications it is even rarer to find effective and efficient synchronization checkpoint interfaces. In some cases, prior art requires a full shutdown of the application, followed by a full backup of the application, followed by a restart of the application. This is unacceptable in most business critical environments. In addition, it is very difficult to do this across multiple servers. Furthermore, even in the cases where applications allow for synchronization, and data protection solutions use those interfaces, there are still significant inefficiencies in this approach. For example, data protection schemes are at the mercy of the applications to provide these interfaces, and these interfaces are often unavailable and when available, often they are very inefficient (e.g., slow performing). Finally, hardware mirroring and replication solutions are typically focused on continuous business operations and cannot recover from corruption problems that require recovery to a previous point in time.

Embodiments of the present invention overcome the foregoing disadvantages.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Disclosed are methods that perform snapshots by efficient copying of new and changed blocks and using a novel method of application synchronization across multiple servers using I/O Freezers.

Specifically, disclosed herein are several embodiments including a data protection system and method that includes a coordination of I/O Freezers running on different machines to achieve a consistent backup of an application running across multiple storage devices across a single or multiple servers.

Another embodiment includes a data protection system and method that provides application data consistent synchronization across multiple storage devices across a single or multiple servers without requiring the application to provide such cross server synchronization support, thus providing a significant new level of application agnosticism.

Yet another embodiment comprises a consistent point in time snapshot of application data taken across multiple storage devices across a single or multiple servers without interfacing with the application at the multi-server level.

A further embodiment includes a method of automatically discovering all storage devices and servers associated with an application (application configuration), monitoring that application configuration for changes, and upon changes automatically updating application synchronization and protection operations associated with that application.

In another embodiment, the ability to synchronize not only application data but also the surrounding Operating System and Configuration information as well as all of the connections between the storage devices and the servers involved in the application is disclosed.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In some preferred embodiments, a novel method of protecting multi storage devices and multi-server applications may be implemented in a consistent manner. For description purposes, and in no way limiting the scope or implementation of the invention, FIG. 1 shows a Multi-Server Business Application 102 which may be comprised of multiple Application Instances 104, wherein each Application Instance 104 may be running on multiple storage devices 106 on a separate Virtual Server (not shown) and/or Production Server 108, such as Production Server 1, Production Server 2, . . . Production Server X. The Application Instances 104 may coordinate together through any communication architecture, such as peer-to-peer, master-slave, etc., to form the Multi-Server Business Application 102. I/O Freezers 110, such as Volume drivers, Disk drivers, I/O Filter drivers, etc., may be employed on each real or virtual Production Server 108 which have the ability to intercept I/O from Application Instances 104. These I/O Freezers 110 may be utilized in a novel manner to coordinate synchronized data protection operations across multiple storage devices across multiple servers. A Synchronized Snapshot Server 112 may receive requests to perform snapshots of a Multi-Server Business Application 102 and/or may coordinate the I/O Freezers 110 to perform a consistent snapshot.

A Synchronized Snapshot Server 112 may continually track all I/O Freezers 110 within its domain. It may also understand which of these I/O Freezers 110 are associated with any multiple storage devices 106 and Multi-Server Business Applications 102. This understanding may be achieved either through manual entry and/or through automatic application resource discovery, such as would be known to one skilled in the relevant prior art. In addition, any associated operating system and configuration information (e.g., related Windows Registry key data, device configurations, etc.) as well as all of the connections between the storage devices 106 and the servers involved in the application may be synchronized and saved.

An application discovery agent may be employed, such as would be known to one skilled in the relevant art, to automatically discover all storage devices 106 and servers associated with an application and/or application configuration. This application discovery agent may perform application discovery at predefined periodic intervals, when a certain event occurs (such as startup, application and/or system configuration changes, new request, etc.), on a random basis, etc. This agent may store this information and it may be used by the Synchronized Snapshot Server 112 to coordinate which storage devices 106, servers, and other resources are associated with a given application. The Synchronized Snapshot Server 112 may dynamically use this information to adjust its application synchronization and/or application protection operations.

Figure 2:
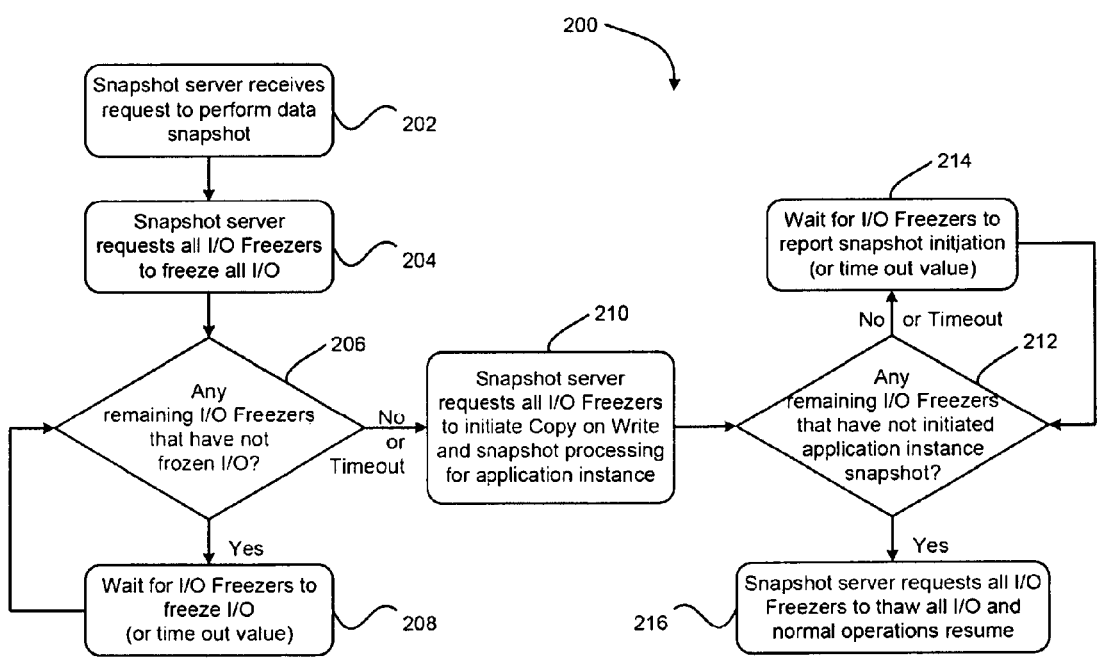
FIG. 2 shows a flowchart of a method according to one embodiment.

FIG. 2 shows a process flowchart according to one embodiment. In certain instances, this method 200 may be used for achieving synchronization of a multi-server application and performing a consistent backup. As an option, the present method 200 may be implemented in the context of the functionality and architecture of FIG. 1. Of course, however, the method 200 may be carried out in any desired environment.

The operations shown in FIG. 2 are for explanatory purposes only, and additional or less operations may be included in any embodiment. Also, some operations may be removed, altered, or modified depending on the desired outcome. For example; in some embodiments, operations 202, 204, and 210 may comprise a fully operational and functional method of obtaining a snapshot of the data.

The Synchronized Snapshot Server (such as 112 in FIG. 1) in operation 202 may receive a request to perform a synchronized snapshot of a multi-storage device and multi-server application (possibly like 102 in FIG. 1).

In operation 204, the Synchronized Snapshot Server may send a request, such as a "Freeze_all_IOs" request, to freeze all, some, and/or one I/O Freezer(s) associated with the multi-server application. Each I/O Freezer may perform a file system lock on all, some, or one storage device(s) or volume(s) on all, some, and/or one server(s) associated with this application. This action may freeze or stop all, some, and/or one I/O to storage devices on its system and may report back to the Synchronized Snapshot Server that it has completed the request.

In operation 208, the Synchronized Snapshot Server may wait until all, some, and/or one I/O Freezer(s) associated with the multi-server application report back that they have frozen all, some, and/or one I/O.

If all, some, and/or one I/O Freezer(s) associated with the multi-server application report back that all, some, and/or one I/O have frozen in operation 206, the process may proceed to operation 210.

After all associated I/O Freezers have frozen all I/O, the Synchronized Snapshot Server, in operation 210, may send a request, such as an "Initiate_Application_Instance_Snapshot" request, to all, some, and/or one I/O Freezer(s) associated with the multi-server application which instructs the I/O Freezer(s) (or an associated agent running in User mode) to initiate a Copy on Write process for all, some, and/or one storage device(s) or volume(s) associated with this application, wherein any attempted updates (e.g., Write I/Os) to any of the storage devices may be copied and may later be applied when the I/O are restarted or thawed.

Each I/O Freezer then initiates a snapshot on its application instance and may report back to the Synchronized SnapShot Server that it has completed the request. In operation 214, the Synchronized Snapshot Server may wait until all, some, and/or one I/O Freezer(s) associated with the multi-server application report back.

In some embodiments, some object other than the I/O Freezer may initiate a snapshot of an application instance associated with the I/O Freezer. In other embodiments, the I/O Freezer which froze the I/O operations may initiate the snapshot on its application instance.

If all, some, and/or one I/O Freezer(s) associated with the multi-server application report back that associated I/O Freezers or some other object have initiated application instance snapshots in operation 212, the process may proceed to operation 216.

In operation 216, after all, some, and/or one associated I/O Freezer(s) have initiated application instance snapshots, the Synchronized Snapshot Server may send a request, such as a "Thaw_all_IOs" request, to all, some, and/or one I/O Freezer(s) associated with the multi-server application, and normal application operations may continue as normal.

In some embodiments, each of the I/O Freezers may initiate a portion of the snapshot operation, the portion being associated with the instance of the application running on the same server as the I/O Freezer. In addition, a portion of the snapshot operation may be associated with a different application than the application running on the same server as the I/O Freezer.

In some embodiments, an association of the I/O Freezers with the application may be determined. Also, an association of the I/O Freezers with any other program, system, user, etc., may be determined. In addition, an association of the application with a data storage device coupled to the server may be determined. Also, an association of the application with a data storage device coupled to a different server may be determined.

In some approaches, storage devices and the servers associated with each instance of the application may automatically be discovered. In further approaches, operating system and configuration information associated with each instance of the application may automatically be discovered. Further, the discovering may be performed at predetermined intervals, upon occurrence of an event, on a random basis, etc.

In a number of embodiments, the I/O Freezers may be instructed to no longer freeze the data requests. One or more data requests may be unfrozen at any given time, and one or more I/O Freezers may receive the request to unfreeze data requests. Further, data requests made during the freezing may be copied and applied after the I/O Freezers are instructed to no longer freeze one or more data requests. Additionally, the data requests from the instances of the application may be rejected during the freezing.

In a preferred embodiment, the snapshot operation takes a snapshot of the data within the same window of synchronization. Alternatively, the snapshot operation may take a snapshot of the data at predefined time intervals, on a random basis, after a certain event occurs on each server, application instance, etc. Further, a "time lapse" picture of the data may be constructed by taking a snapshot of the data over a period of time, noting the differences between the data across servers, application instances, etc.

Figure 3:
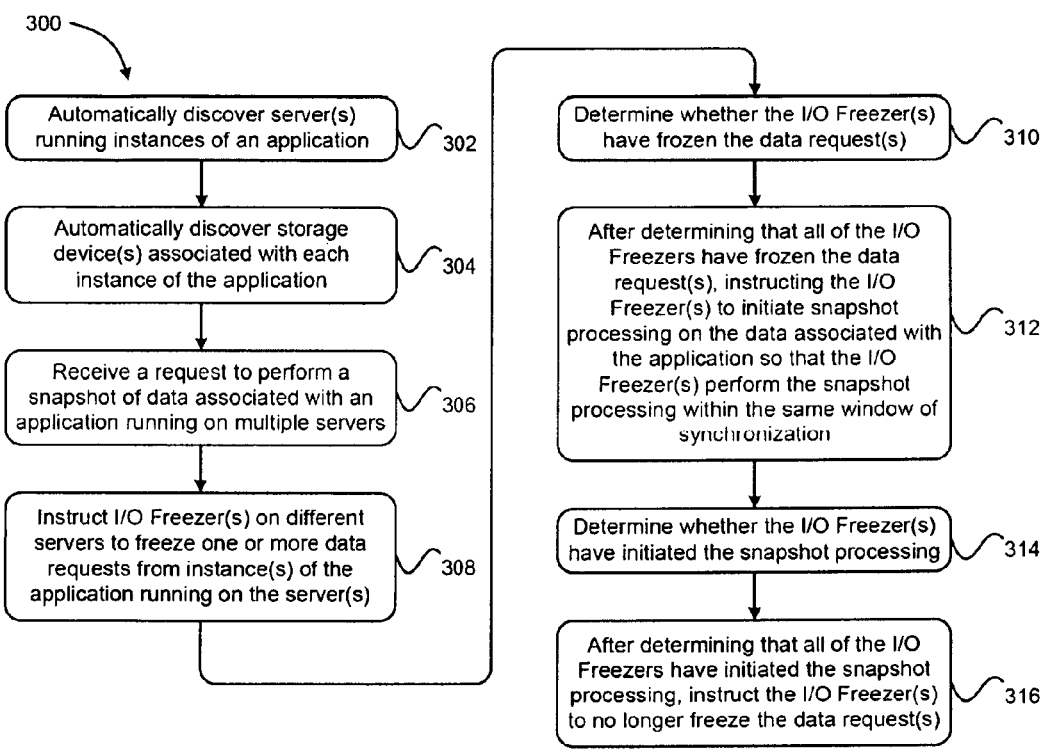
FIG. 3 shows a flowchart of a method according to one embodiment.

Now referring to FIG. 3, a process flowchart according to one embodiment is shown. In certain instances, this method 300 may be used for achieving synchronization of a multi-server application and performing a consistent backup. As an option, the present method 300 may be implemented in the context of the functionality and architecture of FIG. 1. Of course, however, the method 300 may be carried out in any desired environment.

In operation 302, one or more servers running one or more instances of an application may be automatically discovered. Any program, technique, utility, etc., may be used to discover these servers, and common operating system utility files are preferred.

In operation 304, one or more storage devices associated with each instance of the application may be automatically discovered. Any program, technique, utility, etc., may be used to discover these servers, and common operating system utility files are preferred.

In operation 306, a request to perform at least one a snapshot of data associated with at least one application running on multiple servers may be received. The source of the request may be anything, including but not limited to a user, a program, another server, an operating system, etc.

In operation 308, one or more I/O Freezers on different servers may be instructed to freeze one or more data requests from instances of the application running on the servers.

In operation 310, it may be determined whether the one or more I/O Freezers have frozen the one or more data requests. This determination may be made automatically, may be initiated manually, may execute after a predetermined passage of time after the request was sent, etc.

In operation 312, after determining that all of the I/O Freezers have frozen the one or more data requests, the I/O Freezers may be instructed to initiate snapshot processing on the data associated with the application so that the I/O Freezers perform the snapshot processing within the same window of synchronization.

In other embodiments, the instruction to initiate snapshot processing may be at predefined time intervals for different I/O Freezers, on a random basis for different I/O Freezers, after a certain event occurs on each server, after a certain event occurs on each server application instance, etc. Further, a "time lapse" picture of the data may be constructed by taking a snapshot of the data over a period of time, noting the differences between the data across servers, application instances, etc.

In operation 314, it may be determined whether the one or more I/O Freezers have initiated the snapshot processing. This determination may be made automatically, may be initiated manually, may execute after a predetermined passage of time after the request was sent, etc.

In operation 316, after determining that all of the I/O Freezers have initiated the snapshot processing, the I/O Freezers may be instructed to no longer freeze the data requests.

In some embodiments, one or more data requests made during the freezing may be copied and applied after the I/O Freezers are instructed to no longer freeze one or more data requests. In other embodiments, one or more data requests from the instances of the application may be rejected during the freezing.

In some embodiments, the I/O Freezers may be instructed to no longer freeze only certain data requests, while leaving other data requests frozen.

In some embodiments, an association of the I/O Freezers on the servers with the application may be determined. This determination may be made automatically, may be initiated manually, may execute after a predetermined passage of time after the request was sent, etc.

In a few embodiments, operating system and configuration information associated with each instance of the application may be automatically discovered.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    automatically discovering servers running instances of an application;
    automatically discovering storage devices associated with each instance of the application;
    receiving a request to perform a snapshot of data associated with an application running on multiple servers;
    instructing I/O Freezers on different servers to freeze data requests from instances of the application running on the servers;
    determining whether the I/O Freezers have frozen the data requests;
    after determining that all of the I/O Freezers have frozen the data requests, instructing the I/O Freezers to initiate snapshot processing on the data associated with the application so that the I/O Freezers perform the snapshot processing within the same window of synchronization;
    determining whether the I/O Freezers have initiated the snapshot processing; and
    after determining that all of the I/O Freezers have initiated the snapshot processing, instructing the I/O Freezers to no longer freeze the data requests.

2. The method of claim 1, further comprising determining an association of the I/O Freezers with the application.

3. The method of claim 1, further comprising automatically discovering operating system and configuration information associated with each instance of the application.

4. The method of claim 1, wherein data requests made during the freezing are copied and applied after the I/O Freezers are instructed to no longer freeze the data requests.

5. The method of claim 1, wherein the data requests from the instances of the application are rejected during the freezing.

6. A method, comprising:
- automatically discovering servers running instances of an application;
- automatically discovering storage devices associated with each instance of the application;
- automatically discovering operating system and configuration information associated with each instance of the application;
- receiving a request to perform a snapshot of data associated with an application running on multiple servers;
- determining an association of I/O Freezers on the servers with the application;
- instructing the I/O Freezers on different servers to freeze data requests from instances of the application running on the servers;
- determining whether the I/O Freezers have frozen the data requests;
- after determining that all of the I/O Freezers have frozen the data requests, instructing the I/O Freezers to initiate snapshot processing on the data associated with the application so that the I/O Freezers perform the snapshot processing within the same window of synchronization;
- determining whether the I/O Freezers have initiated the snapshot processing; and
- after determining that all of the I/O Freezers have initiated the snapshot processing, instructing the I/O Freezers to no longer freeze the data requests,
- wherein data requests made during the freezing are copied and applied after the I/O Freezers are instructed to no longer freeze the data requests.

7. The method of claim 6, wherein the discovering is performed at predetermined intervals.

8. The method of claim 6, wherein the discovering is performed upon occurrence of a predefined event.

* * * * *